Feb. 24, 1959　　　J. C. WEIDEL　　　2,874,456
METHOD OF DETERMINING TUBE SHAPES
Filed Oct. 26, 1953　　　　　　　　　　　2 Sheets-Sheet 1
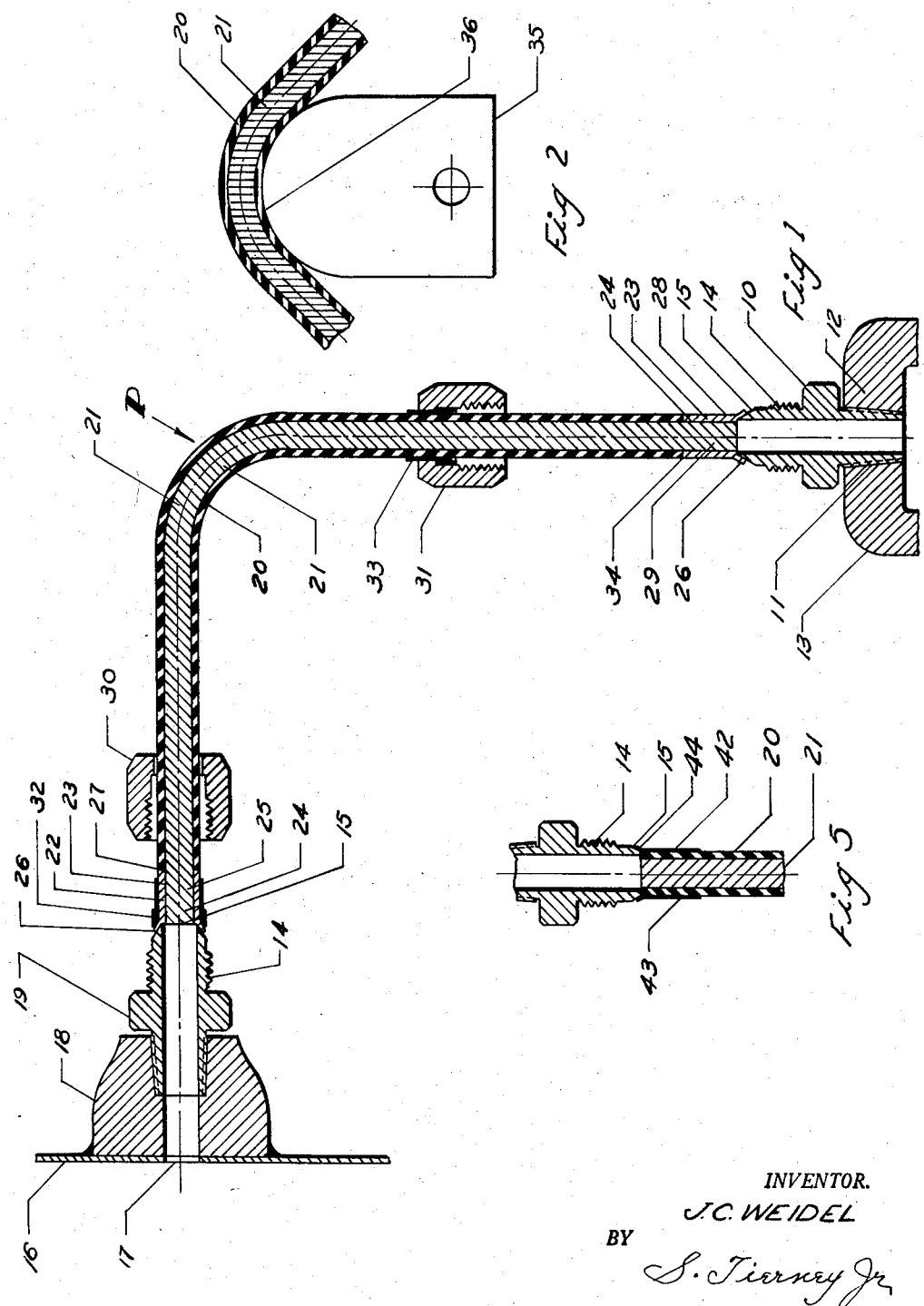
INVENTOR.
J.C. WEIDEL
BY
S. Tierney Jr.

Feb. 24, 1959 J. C. WEIDEL 2,874,456
METHOD OF DETERMINING TUBE SHAPES
Filed Oct. 26, 1953 2 Sheets-Sheet 2
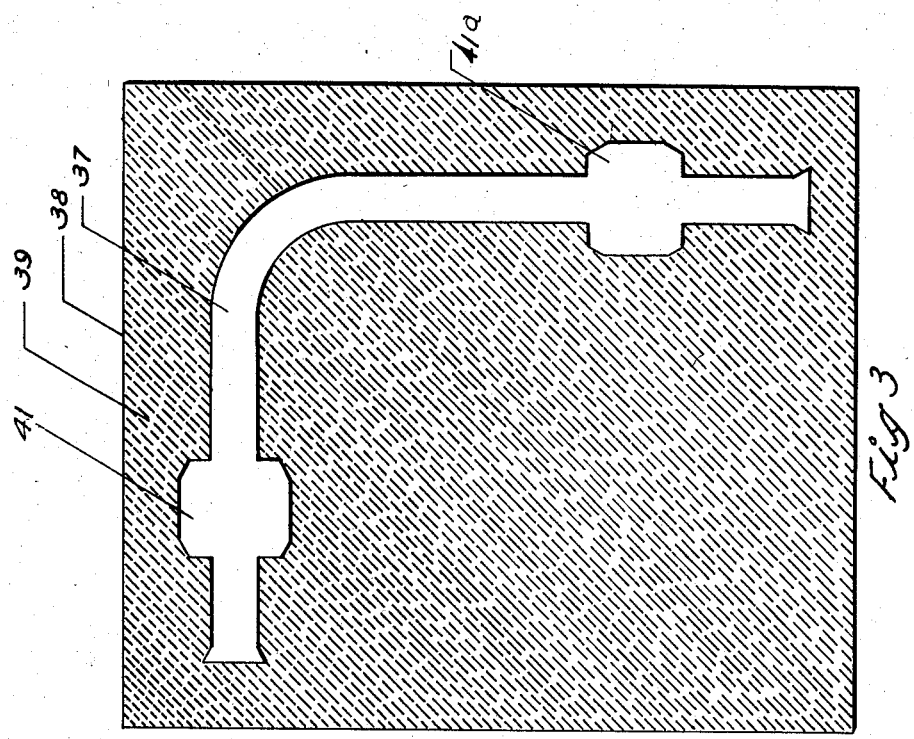
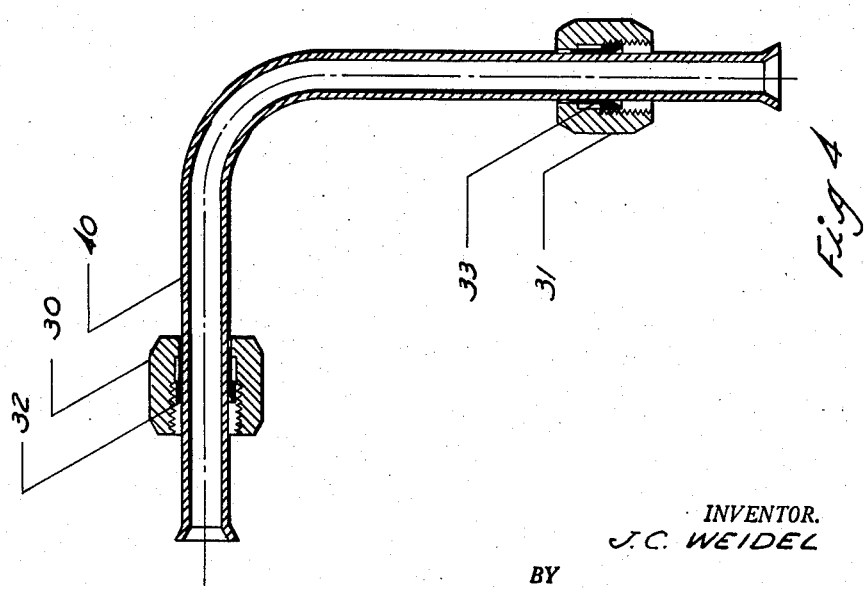
INVENTOR.
J.C. WEIDEL
BY
S. Tierney Jr.

United States Patent Office 2,874,456
Patented Feb. 24, 1959

2,874,456
METHOD OF DETERMINING TUBE SHAPES

Joseph C. Weidel, Riverside, Calif., assignor to Rohr Aircraft Corporation, Chula Vista, Calif., a corporation of California Application October 26, 1953, Serial No. 388,338

5 Claims. (Cl. 29—407)

This invention relates to a method of making a pattern having the shape in which a rigid conduit is to be formed to permit the ends of the conduit to engage and be attached to two spaced apart conduit fittings.

In many mechanical structures, as for example an aircraft power plant, a large number of rigid conduits are used, which, due to the compactness and complexity of the structure, must be formed into various shapes to permit their installation. The required shape of each of these conduits has heretofore been determined by a trial and error method consisting of first roughly measuring or estimating the required length of the conduit and then gradually shaping and fitting it into position until the desired length and shape are obtained. This method is necessarily very time consuming and, due to errors in determining the length of the conduit and in shaping it, results in considerable wastage of material.

It is therefore an object of my invention to provide a method for quickly and easily making a pattern having the exact shape and size of the rigid conduit to be formed and from which the required length and shape of the rigid conduit may be determined.

A further object is to provide a method for making a pattern as before mentioned from inexpensive and easily obtainable materials which may be readily formed into the proper shape.

These and other objects and advantages will become apparent as the description of the method proceeds. For a better understanding of the invention reference is made to the accompanying drawing illustrating an application of the method in which similar numbers refer to similar parts and in which:

Fig. 1 is a longitudinal sectional view of a pattern formed according to the invention between two conduit connecting fittings.

Fig. 2 is a top view of a forming block used in shaping the pattern.

Fig. 3 is a top view of a plaster block having the outline of the pattern molded into the surface.

Fig. 4 is a longitudinal sectional view of a rigid conduit formed to the shape of the pattern and, Fig. 5 is a sectional view of an alternate type of connector which may be used in the construction of the pattern.

With reference to Fig. 1 of the drawing a conduit connecting fitting 10 of a known type is threadedly engaged in an opening 11 passing through the wall 12 of a pump 13. The projecting portion 14 of fitting 10 is threaded for engagement with a conduit securing nut and the extreme end 15 of fitting 10 is tapered to fit smoothly against the inner surface of the flaring end of a rigid conduit. A tank wall 16 provided with an opening 17 passing therethrough has a threaded collar 18 secured to it around opening 17 in which a conduit connecting fitting 19 similar to fitting 10, is threadedly engaged. To ascertain the required length and shape of a rigid conduit to be used to connect fittings 10 and 19 together, a pattern P is made having the shape and size of the rigid conduit. Pattern P comprises a tube 20 having an outside diameter equal to the outside diameter of the rigid conduit and is preferably slightly greater in length than the distance between fittings 10 and 19. Tube 20 is preferably composed of a very flexible rubber-like material and is provided with a core 21 of non-resilient pliable material such as a lead rod or soft copper tube which remains in the shape to which it is bent. Core 21 is sufficiently large in diameter to fit smoothly and snugly inside tube 20 and is the same length as tube 20. A connector 22 having a cylindrically shaped body portion 23, the outside diameter of which is equal to the outside diameter of tube 20, and a central bore 24 into which the end 25 of core 21 fits smoothly and closely is attached to end 25 of core 21. The outer end 26 of connector 22 is similar in size and shape to the flaring end of the rigid conduit to be made and is adapted to fit smoothly against end 15 of fitting 19. To permit end 25 of core 21 to be inserted into bore 24, a portion of tube 20 at its end 27 is cut off so that end 25 of core 21 projects outwardly from tube 20 a distance equal to the length of bore 24. A similar connector 28 is attached to end 29 of core 21 in a like manner as will be later described. A pair of conduit securing nuts 30 and 31 and collars 32 and 33 of a known type are placed on tube 20 for a purpose to be explained.

To form the above described assembly into a pattern having the shape of the desired rigid conduit, end 26 of connector 22 is positioned against end 15 of fitting 19 and secured thereto by means of collar 32 and securing nut 30. Tube 20 and core 21 are then bent as necessary to bring end 24 of core 21 and end 34 of tube 20 into alignment with fitting 10. Due to tube 20 and core 21 being slightly longer than the distance between fittings 10 and 19, ends 29 and 34 of core 21 and tube 20 will extend past end 15 of fitting 10. The portions of ends 29 and 34 extending past end 15 of fitting 10 are severed from the tube 20 and core 21 making them exactly the length required to reach the end of fitting 10. A portion of end 34 of tube 20 equal to the length of bore 24 in connector 28 is cut off and the projecting end 29 of core 21 inserted into bore 24 to attach connector 28 to the core. End 26 of connector 28 is then placed against end 15 of fitting 10 and if desired may be secured thereto by means of nut 31 and collar 33.

In bending rigid conduits it is the usual practice, in order to avoid damaging it to bend the conduit to an arc of a circle having a certain predetermined radius. This radius is determined from the diameter of the conduit and the material from which it is made. To bend tube 20 and core 21 to the same arc that will be followed in bending the rigid conduit, a forming block 35 (see Fig. 2) having one end 36 curved in the proper arc is used as a guide around which the bend in tube 20 and core 21 is made.

Pattern P is now completed and has the exact size and shape of the rigid conduit to be used for connecting fittings 10 and 19 together. Nuts 30 and 31 are detached from fittings 10 and 19 and the pattern removed from between the fittings, care being exercised to avoid altering its shape. Since the shape of pattern P is easily changed it is desirable to make a permanent mold or template having the exact shape of the pattern. This template is then used as a guide in forming the rigid conduits. With reference to Fig. 3 a permanent mold 37 having the exact shape and size of the lower half of pattern P as is therein shown, is made by first placing pattern P on a suitable support. Securing nuts 30 and 31 are moved to substantially the same position on tube 20 as the positions in which they are shown in Fig. 1 and collars 32 and 33 are placed inside nuts 30 and 31 respectively. Modeling plaster which has been mixed with water to a desired consistency is placed under and around pattern P in a solid mass 38 the surface 39 of which is built up around pattern P a distance of one half the diameter of tube 20. Surface 39 is then permitted to harden and pattern P is removed from surface 39 to complete mold 37. From permanent mold 37 the measurements of the length and degree of bend required in the rigid conduit are taken and rigid conduit 40 (see Fig. 4) is formed accordingly. When a number of conduits 40 have to be made, mold 37 serves as an inspection gage to indicate whether they are of the proper size and shape. For this purpose, the nut 30 with collar 32 are placed in mold recess 41 and nut 31 with its collar 33 placed in recess 41a as conduit 40 is laid in mold 37. If the conduit including its flared ends fits snugly within mold 37, it is the proper size to connect fittings 10 and 19 together.

With reference to Fig. 5 a connector 42 is shown which may be used instead of connectors 22 and 28 in making pattern P. Connector 42 has a hollow body portion 43 of thin material which is adapted to fit over and engage the outer surfaces of the ends of tube 20. The outer end 44 of connector 41 is similar in shape to the flaring end of the rigid conduit to be made and is adapted to engage ends 15 of fittings 10 and 19 and to be secured thereto by securing nuts 30 and 31 and collars similar to 32 and 33. Connectors 22 and 42 are both preferably made of metal however other types of rigid materials may be used. While the ends of connectors 22 and 42 are illustrated as tapered, it will be understood that they may be of any suitable shape to register with any of the known shapes of connecting fittings.

This invention may be embodied in other forms or carried out in other ways without departing from the spirit or essential characteristics thereof. The present embodiment of the invention is therefore to be considered as in all respects illustrative and not restrictive, the scope of the invention being indicated by the appended claims, and all changes which come within the meaning and range of equivalency of the claims are intended to be embraced therein.

Having thus described my invention, what I claim as new and useful and desire to secure by Letters Patent is:

1. The method of making a pattern having the shape and size of a rigid conduit adapted to connect together two spaced apart hollow connecting fittings, comprising the steps of providing a flexible non-metallic tube with a non-resilient, pliable supporting core, said tube having an outside diameter equal to the outside diameter of said conduit and a length greater than the distance between said fittings; securing one end of said tube to one of said fittings; bending an intermediate portion of said tube and core to direct the other end of said tube into alignment with the other fitting; severing the other end of said tube and core at the other fitting; and removing said tube and core from the fittings without altering the shape of the core and tube.

2. The method of making a pattern having the shape and size in which a rigid conduit is to be formed to provide a connection between two spaced apart openings each of which is provided with a conduit connecting fitting, comprising the steps of providing a flexible non-metallic tube with a non-resilient pliable supporting core, said tube having an outside diameter equal to the outside diameter of the rigid conduit and being of sufficient length to extend between said fittings; securing a connector to each end of said core, said connectors being shaped complemental to said conduit fittings; attaching one of said connectors to one of said fittings; bending an intermediate portion of said tube and core to direct the other connector into contact with the other fitting; detaching said one connector from said one fitting; and removing said tube, core and connectors from the fittings without altering the shape of the core and tube.

3. The method of making a pattern having the shape and size in which a rigid conduit is to be formed to provide a connection between two spaced apart openings each of which is provided with a conduit connecting fitting, comprising the steps of providing a flexible non-metallic tube with a non-resilient pliable supporting core, said tube having an outside diameter equal to the outside diameter of the rigid conduit and being of sufficient length to extend between said fittings; securing a connector to each end of said core, said connectors having exposed ends adapted to engage said conduit fittings; pressing said tube and core against the curved surface of a forming block thereby bending said tube and core into a shape which will permit said connectors to engage said fittings; and removing said tube from between said fittings without altering the shape of the core and tube.

4. The method of making a pattern having the shape of a rigid conduit to connect together two spaced apart hollow connecting fittings, comprising the steps of providing a flexible tube with a non-resilient pliable core, said tube having an outside diameter equal to the outside diameter of said conduit and a length greater than the distance between said fittings; severing a portion from one end of said tube and removing it from around said core permitting one end of said core to project from the tube; placing a first connector on the projecting end of said core, said connector having a cylindrical body portion the diameter of which is equal to the diameter of said tube, said body being provided with a central bore adapted to receive the projecting end of said core and an outer end shaped complemental to the end of said hollow fitting; attaching said connector to one of said fittings; bending an intermediate portion of said tube and core to direct the other end of said tube into alignment with the other fitting; severing the other end of said tube and core at said other fitting; severing a portion from the other end of said tube and removing it from said core permitting the other end of said core to project from said tube; attaching a second connector to the other end of said core in contact with said other fitting; detaching said first connector from said fitting; and removing said tube, core and connectors from the fittings without altering the shape of the core.

5. The method of making a pattern having the size and shape of a rigid conduit adapted to connect together two spaced apart hollow conduit fittings comprising the steps of inserting a metallic, non-resilient, pliable supporting core into a flexible, non-metallic tube having an outside diameter equal to the outside diameter of the rigid conduit and a length equal to the distance between said fittings; securing one end of said tube and core to one of said fittings; bending intermediate portions of said tube and core to direct the other end of the tube into alignment with the other fitting; and removing the tube and core from between the fittings without altering the shape of the tube and core.

References Cited in the file of this patent

UNITED STATES PATENTS

| | | |
|---|---|---|
| 1,520,143 | Sandell | Dec. 23, 1924 |
| 2,205,311 | Sabatello | June 18, 1940 |
| 2,348,086 | Miller | May 2, 1944 |
| 2,397,168 | Touceda | Mar. 26, 1946 |